Figure 5:
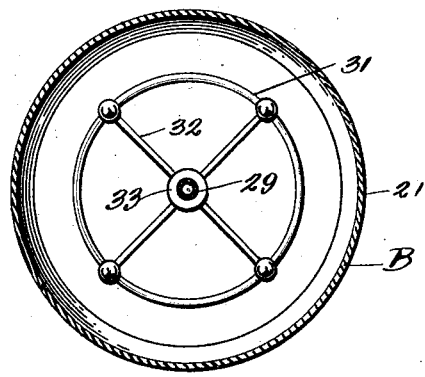

April 30, 1929.  H. I. JACOBS  1,711,202
DELIVERY VEHICLE
Filed March 2, 1927   4 Sheets-Sheet 1
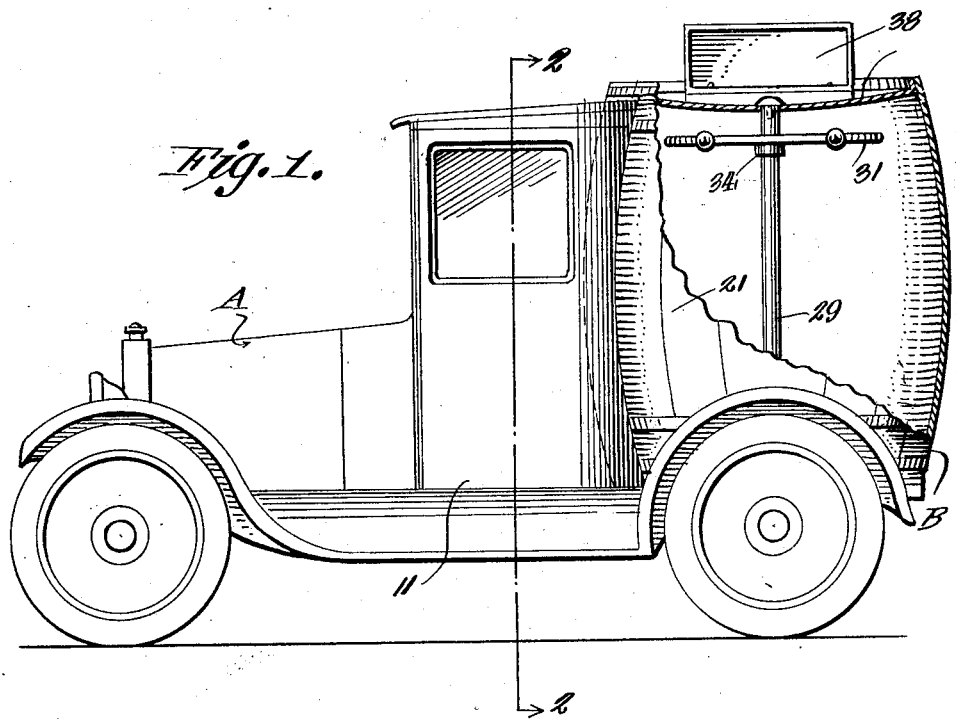
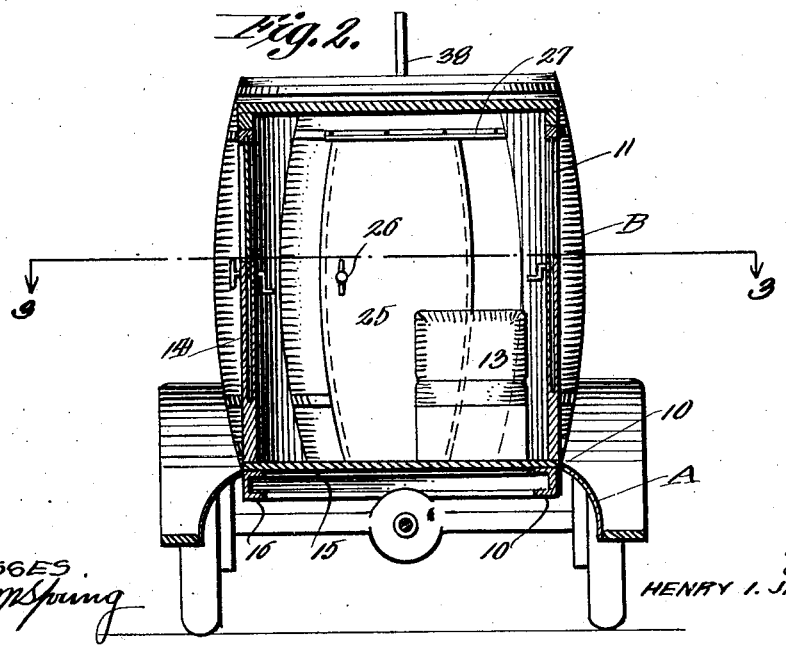
WITNESSES
Inventor
HENRY I. JACOBS
By
Attorney April 30, 1929.  H. I. JACOBS  1,711,202
DELIVERY VEHICLE
Filed March 2, 1927    4 Sheets-Sheet 2
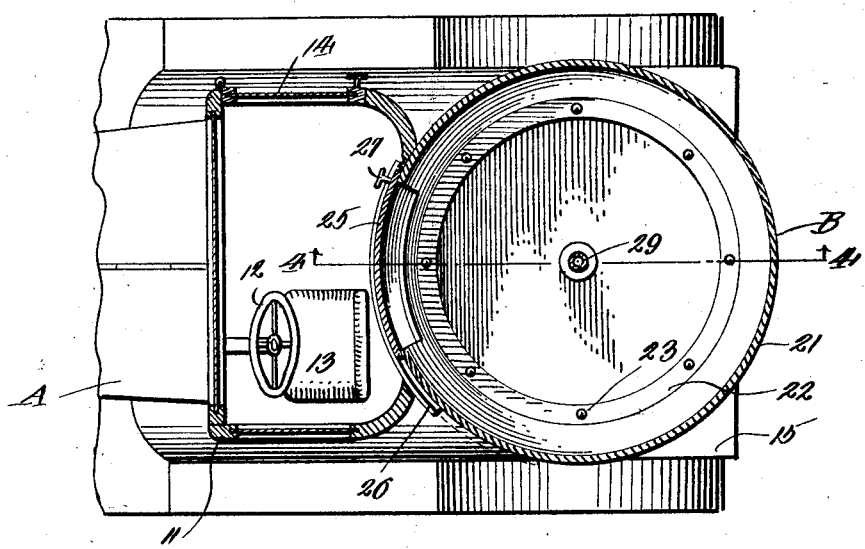
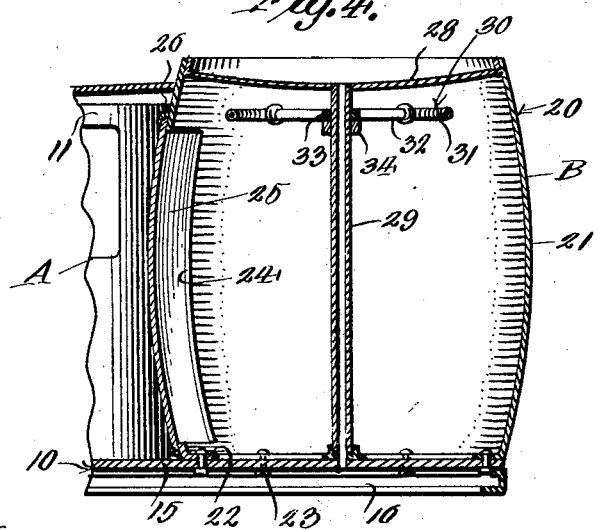
WITNESSES
Inventor
HENRY I. JACOBS April 30, 1929.   H. I. JACOBS   1,711,202
DELIVERY VEHICLE
Filed March 2, 1927    4 Sheets-Sheet 3

WITNESSES
Guy M Spring

Inventor
HENRY I. JACOBS
By Richard B Owen
Attorney

April 30, 1929.　　　H. I. JACOBS　　　1,711,202
DELIVERY VEHICLE
Filed March 2, 1927　　4 Sheets-Sheet 4
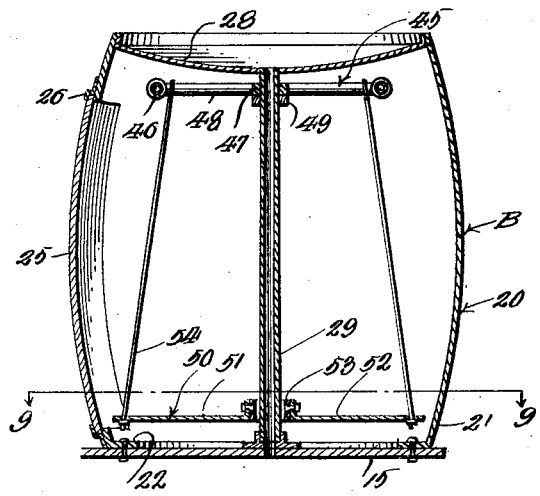
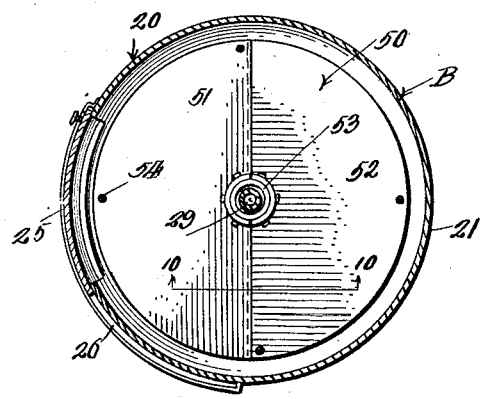
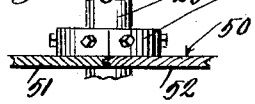
WITNESSES
Inventor
HENRY I. JACOBS
By Richard B. Owen, Attorney Patented Apr. 30, 1929.

1,711,202

UNITED STATES PATENT OFFICE.

HENRY I. JACOBS, OF BOZEMAN, MONTANA, ASSIGNOR OF FORTY-NINE PER CENT TO WILLARD C. DAWES, OF BOZEMAN, MONTANA.

DELIVERY VEHICLE.

Application filed March 2, 1927. Serial No. 172,092.

This invention relates to vehicles and more particularly to delivery trucks, such as are employed for clothes cleaning establishments.

One of the primary objects of the present invention is to provide a light delivery truck for cleaning and pressing establishments having a novel and attractive body for creating an impression upon the trade and in which the clothes can be readily reached from the driver's department.

Another salient feature of the invention is to provide a distinctive body for an automobile delivery truck or the like shaped to simulate the appearance of a barrel with novel means arranged directly in the barrel body for supporting the clothes to be delivered.

A further object of the invention is to provide a delivery truck embodying the usual driver's compartment and a body shaped to simulate the appearance of a barrel forming the rear wall of the driving compartment or cab, the body having a suitable door therein for communication with the compartment or cab whereby the clothes can be conveniently placed in or removed from the barrel body.

A further object of the invention is the provision of a novel clothes hanger arranged in the barrel body including a rotatable supporting ring upon which the clothes hangers are adapted to be hung, whereby the clothes can be moved toward the door to facilitate the removal thereof, the hanger including a bottom plate for preventing the dragging of the clothes upon the bed of the chassis.

A further object is to provide a delivery truck for clothes pressing and cleaning establishments including a barrel body having the top or head thereof concaved for drainage purposes and communicating with an axially disposed pipe extending entirely through the barrel body for permitting rain water and the like to be conveyed to the ground below the truck, the drain pipe constituting a support for the rotatable clothes hanger.

A still further object of the invention is to provide a delivery truck having a novel barrel body which will be durable and efficient in use, one that will be simple and easy to manufacture and one which can be placed upon the market at a small cost.

The present device may be very effectively used as an advertising medium.

Figure 6:
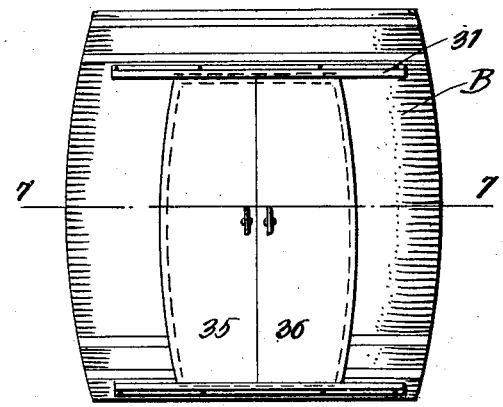
Figure 7:
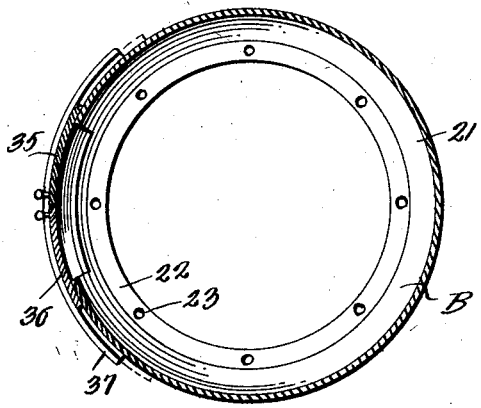

With these and other objects in view, the invention consists in the novel construction, arrangement and formation of parts, as will be hereinafter more specifically described, claimed and illustrated in the accompanying drawings, in which drawings:

Figure 1 is a side elevation of the novel delivery truck showing the barrel body thereof broken away and in section to illustrate the construction thereof, Figure 2 is a transverse section through the truck taken on the line 2—2 of Figure 1 looking in the direction of the arrows illustrating the communication of the barrel body with the driver's compartment, Figure 3 is a horizontal section of the truck taken on the line 3—3 of Figure 2 looking in the direction of the arrows, Figure 4 is a fragmentary longitudinal section of the truck taken on the line 4—4 of Figure 3 looking in the direction of the arrows, Figure 5 is a horizontal section through the barrel body showing the novel revolving hanger, Figure 6 is a front elevation of a slightly modified form of the barrel body, Figure 7 is a horizontal section of the modified form of barrel body taken on the line 7—7 of Figure 6, Figure 8 is a vertical section through the barrel showing a modified form of clothes hanger, Figure 9 is a section taken on the line 9—9 of Figure 8 looking in the direction of the arrows, and Figure 10 is a detail section through the platform of the hanger taken on the line 10—10 of Figure 9.

Referring to the drawing in detail, wherein similar reference characters designate corresponding parts throughout the several views, the letter A generally indicates a light delivery truck and B the novel body therefor.

The truck A can be of any preferred type of make and includes a conventional chassis 10 having mounted thereon a driver's compartment or enclosed cab 11. The cab 11 has disposed therein at one side thereof and directly in rear of the steering wheel 12, the folding driver's seat 13. The cab can be provided with suitable entrance and exit doors 14. Disposed upon the chassis are suitable floor boards or a bed 15 which can be bolted or otherwise secured to the side channel beams 16 of the chassis.

The improved body B is mounted directly on the chassis 10 in rear of the driver's compartment or cab 11 and this body is built to simulate the appearance of a barrel, as can be readily seen by referring to the drawings. The body can be constructed from any desired material, such as sheet steel or the desired gage and includes the cylindrical wall 20 which is bilged intermediate its ends, as at 21 to conform to the usual barrel shape. The lower edge of the body 20 is bent inwardly at right angles to provide an attaching flange 22 which is bolted as at 23 to the bed 15. The wall 20 forms the rear wall for the driving compartment or cab 11 as clearly shown in Figures 3 and 4 and this portion of the wall 20 is provided with the door opening 24, whereby direct communication can be had to the barrel from said driver's compartment. The door opening 24 is closed by any preferred type of door 25, which in the present instance is shown to be of the sliding type, the upper and lower edges of the door being mounted in suitable guides 26 carried by the wall 20. A suitable handle 27 is carried by the door 25 to facilitate the sliding thereof back and forth from the interior of the driving compartment or cab 11.

The upper end of the barrel body receives a cap or head 28 which can be secured in place in any desired way and this head is preferably dished or concavo-convex configuration, so that rain water and the like will gravitate toward the center thereof. A drain pipe 29 is disposed axially within the body and communicates with the axial center of the head 28 and opens out through the lower end of the body. As shown this drain pipe is extended entirely through the bed 15.

The pipe 29 also forms a support for the revolving hanger 30 which is utilized for supporting the clothes to be delivered and this hanger 30 includes an annular hoop or ring 31 connected by means of spokes or arms 32 with the hub 33. This hub is rotatably mounted upon the pipe and is supported by a suitable cup or collar 34.

The exterior of the body is painted to simulate a barrel with the ordinary staves and hoops, while the interior thereof is painted a light attractive color.

The barrel body will present a pleasing and attractive appearance and the construction thereof will permit the convenient handling of the clothes without damage thereto.

Any desired advertising matter can be painted on the exterior of the barrel body and if preferred a sign 38 can be secured on the body of the barrel as shown in Figures 1 and 2.

In Figures 6 and 7 I have shown a slightly modified form of the body B and in this form a pair of sliding doors 35 and 36 are utilized instead of the single sliding doors as shown in the other form as described. The doors 35 and 36 are disposed at the front of the body and are also mounted in suitable upper and lower guideways 37 carried by the barrel body.

A suitable lock is preferably provided for the doors in both forms of the invention, whereby access to the barrel by unauthorized persons will be prevented.

In Figures 8 to 9 inclusive I have shown a modified form of hanger 45 for the clothes and this hanger 45 includes an annular hoop or ring 46 connected with a hub 47 by arms 48. The hub is rotatably mounted on the pipe 29 adjacent to the upper end thereof and is held against downward movement by a bearing cup 49 rigidly secured to the pipe. A revolving bottom or platform 50 is provided for the barrel and the same rotates with the hoop 46 to prevent the clothes from dragging over the bed 15 of the vehicle, when the hanger is turned. This bottom 50 is preferably made in a pair of semi-circular sections 51 and 52 fitted about the pipe 29 and bolted to a revolving collar 53 arranged upon the pipe. The sections 51 and 52 can be connected together by a suitable lock joint, as shown. The platform or bottom 50 is hung from the hoop 46 by suitable supporting rods 54.

Changes in details may be made without departing from the spirit or scope of this invention, but what I claim as new is:

The combination with a chassis of a delivery vehicle having a closed driver's compartment thereon, of a display body for the chassis including a cylindrical wall bowed intermediate its ends and forming a rear wall for the driver's compartment, a head for the upper end of the side wall connected therewith, an attaching flange on the lower end of the side wall secured to the chassis, a drain pipe extending axially through the body communicating with the axial center of said head, a revolving clothes hanger upon the drain pipe, a floor for said body rotatably mounted upon the drain pipe, and means connecting the floor with the hanger for rotation therewith, and a door for the body opening into the driver's compartment.

In testimony whereof I affix my signature.

HENRY I. JACOBS.